United States Patent
Doty et al.

(10) Patent No.: US 8,271,454 B2
(45) Date of Patent: Sep. 18, 2012

(54) CIRCULAR LOG AMNESIA DETECTION

(75) Inventors: John D. Doty, Seattle, WA (US); Craig A. Critchley, Fall City, WA (US)

(73) Assignee: Microsoft Corporation, Redmond, WA (US)

( * ) Notice: Subject to any disclaimer, the term of this patent is extended or adjusted under 35 U.S.C. 154(b) by 875 days.

(21) Appl. No.: 11/959,352

(22) Filed: Dec. 18, 2007

(65) Prior Publication Data

US 2009/0157767 A1    Jun. 18, 2009

(51) Int. Cl.
G06F 7/00 (2006.01)
G06F 17/00 (2006.01)
G06F 17/30 (2006.01)

(52) U.S. Cl. ........................ 707/674; 707/793
(58) Field of Classification Search ................ 707/674, 707/689, 826, 793, 800, 819
See application file for complete search history.

(56) References Cited

U.S. PATENT DOCUMENTS

| | | | |
|---|---|---|---|
| 4,358,777 A | 11/1982 | Bille | |
| 4,819,162 A | 4/1989 | Webb, Jr. et al. | |
| 5,590,318 A * | 12/1996 | Zbikowski et al. | 707/202 |
| 5,696,702 A | 12/1997 | Skinner et al. | |
| 6,016,553 A * | 1/2000 | Schneider et al. | 714/21 |
| 6,446,086 B1 | 9/2002 | Bartlett et al. | |
| 6,832,176 B2 | 12/2004 | Hartigan et al. | |
| 7,143,317 B2 * | 11/2006 | Lyle et al. | 714/45 |
| 7,274,375 B1 | 9/2007 | David | |
| 2003/0033554 A1 * | 2/2003 | Bomfim et al. | 714/4 |
| 2004/0054908 A1 * | 3/2004 | Circenis et al. | 713/176 |
| 2004/0107198 A1 * | 6/2004 | Ronstrom | 707/100 |
| 2004/0193622 A1 * | 9/2004 | Peleg et al. | 707/100 |
| 2004/0230623 A1 * | 11/2004 | D'Angelo et al. | 707/202 |
| 2004/0249694 A1 | 12/2004 | Luo | |
| 2006/0100972 A1 | 5/2006 | Chianese et al. | |
| 2007/0022144 A1 * | 1/2007 | Chen | 707/204 |
| 2007/0130148 A1 | 6/2007 | Wu | |
| 2007/0143169 A1 | 6/2007 | Grant et al. | |
| 2007/0276878 A1 * | 11/2007 | Zheng et al. | 707/202 |
| 2008/0046476 A1 * | 2/2008 | Anderson et al. | 707/200 |
| 2008/0046479 A1 * | 2/2008 | Pareek et al. | 707/202 |
| 2008/0189259 A1 * | 8/2008 | Kapur | 707/5 |
| 2009/0150599 A1 * | 6/2009 | Bennett | 711/103 |

OTHER PUBLICATIONS

Complete Time Tracking Software (3 pages) http://www.complete-time-tracking.com/time-tracking-software-details/.
Investigating Data Quality Problems in the PSP (10 pages) http://www2.umassd.edu/swpi/PersonalSoftwareProcess/papers/98-04.pdf.
Activity & Expense Tracker (3 pages) http://productivity-software.com/aetracker/.

* cited by examiner

*Primary Examiner* — Jeffrey A Burke
(74) *Attorney, Agent, or Firm* — Workman Nydegger

(57) ABSTRACT

The setting up of a circular log implementation to be able to detect amnesia in a circular log, and to the determination of whether or not amnesia has occurred in such a circular log. Upon detecting a checkpoint trigger, information is preserved sufficient to detect whether or not the removed records ever existed in the circular log. If a request for information from a record were subsequently to be received by the circular log implementation, and if the record was not actually in the circular log, the preserved information could then be consulted to see if it indicates that the record had once existed in the circular log. If the information indicates that the record had once existed in the circular log, then amnesia has not occurred. If the information does not indicate that the record had once existed in the circular log, then amnesia has occurred. Accordingly, amnesia detection is made possible even in a complicated circular log implementation.

20 Claims, 7 Drawing Sheets

| LSN 0 | LSN 1 | LSN 2 | LSN 3 | LSN 4 | LSN 5 |
|-------|-------|-------|-------|-------|-------|
| UID A | UID A | UID A | UID A | UID A | UID A |

Backed Up Region

*FIG. 2A*

| LSN 0 | LSN 1 | LSN 2 | LSN 3 | LSN 4 | LSN 5 | LSN 6 | LSN 7 | LSN 8 |
|-------|-------|-------|-------|-------|-------|-------|-------|-------|
| UID A | UID A | UID A | UID A | UID A | UID A | UID A | UID A | UID A |

Backed Up Region / Additional Records

*FIG. 2B*

| LSN 0 | LSN 1 | LSN 2 | LSN 3 | LSN 4 | LSN 5 | LSN 6 | LSN 7 | LSN 8 |
|-------|-------|-------|-------|-------|-------|-------|-------|-------|
| UID A | UID A | UID A | UID A | UID A | UID A | UID A | UID A | UID A |

Restored From Backup Region / Lost (Amnesia)

*FIG. 2C*

| LSN 0 | LSN 1 | LSN 2 | LSN 3 | LSN 4 | LSN 5 | LSN 6' | LSN 7' | LSN 8' |
|-------|-------|-------|-------|-------|-------|--------|--------|--------|
| UID A | UID A | UID A | UID A | UID A | UID A | UID B  | UID B  | UID B  |

Restored From Backup Region / New Records

*FIG. 2D*

| LSN 0" | LSN 1" | LSN 2" | LSN 3" | LSN 4" |
|--------|--------|--------|--------|--------|
| UID C  | UID C  | UID C  | UID C  | UID C  |

New Records After Reset

*FIG. 2E*

Backed Up Region

Backed Up Region | Additional Records

Restored From Backup Region | Lost (Amnesia)

Restored From Backup Region | New Records

New Records After Reset

| LSN 0 | LSN 1 | LSN 2 | LSN 3 | LSN 4 | LSN 5 | LSN 6' | LSN 7' | LSN 8' | LSN 9 | LSN 10 | LSN 11 | LSN 12 | LSN 13 | LSN 14 |
|---|---|---|---|---|---|---|---|---|---|---|---|---|---|---|
| UID A | | | | | | UID B | | | UID C | | | | | |

Restored From Backup Region | New Records | Newer Records

*FIG. 5A*

| LSN 7' | LSN 8' | LSN 9 | LSN 10 | LSN 11 | LSN 12 | LSN 13 | LSN 14 |
|---|---|---|---|---|---|---|---|
| | | UID C | | | | | |

New Records | Newer Records

CIRCULAR LOG AMNESIA DETECTION

BACKGROUND

A computer file that records actions that have occurred is commonly referred to as a log file. A log file represents a durable and consistent recording of all the work that was done during a single continuous time interval. Typically, when an action that is to be logged occurs, a log implementation appends or otherwise writes a record to the log file. Log files may be text files, binary files, or data files (stateful or stateless). For example, servers typically maintain log files listing requests made to the server. Web servers maintain log files containing a page request history. Log clients, on the other hand, query the log file to acquire information regarding prior actions recorded in the log file. Examples of log clients include log analysis software, file analysis tools, transaction managers, queue managers, and databases.

Unfortunately, log files can experience "amnesia", which occurs when one or more records of the log file are undesirably lost. The log implementation experiences "amnesia" because the log implementation is not often initially aware that records have been lost, at least until the log implementation detects this amnesia. The detection of amnesia is a complex problem even when operating on a simple log. However, as will now be described, some logs are even more complicated, thereby rendering the detection of amnesia as being quite a difficult problem indeed.

One type of log is called an "infinite" log. In an infinite log, once a record is written to the log file, the record is available for all time. Of course, an infinite log can grow larger, where the pace of growth depends on the pace at which records are written to the log, and depending on the size of the records. In many implementations, the infinite log may even grow to an unwieldy size well before time renders the log as irrelevant.

A "circular" log is a log that somewhat simulates an infinite log without the same growth problems inherent in an infinite log. A circular log is a log where certain records are removed from the log in order to save storage space. A circular log implementation uses a protocol called a "checkpoint" protocol to allow this to occur safely.

A typical checkpoint protocol executes a checkpoint in response to a particular trigger. Conventional checkpoint triggers include, for example, 1) free space available in the log dropping below a threshold level, 2) the expiration of a timer, and 3) the detection of a user request to execute a checkpoint. In response to a checkpoint trigger, the log implementation contacts each log client that uses the circular log, and requests that each log client identify the earliest record that that log client is interested in. For each log client, that earliest record is called a "low water mark". The log implementation then calculates a "global low water mark" determining the earliest "low water marks" of all of the log clients. The log implementation then records the global low water mark, and the space previously used for record identifiers (often referred to as "Log Sequence Numbers" or "LSNs") earlier than the global low water mark is released, thereby freeing up storage. As this checkpoint process repeats, the global low water mark advances and deletes aging records.

BRIEF SUMMARY

Embodiments described herein relate to the setting up of a circular log implementation to be able to detect amnesia in a circular log, and/or to the determining whether or not amnesia has occurred. Upon detecting a checkpoint trigger, one or more records may be removed from the circular log. However, information is preserved sufficient to detect whether or not the removed records ever existed in the circular log. If a request for information from a record were subsequently to be received by the circular log implementation, and if the record was not actually in the circular log, the preserved information could then be consulted to see if it indicates that the record had once existed in the circular log. If the information indicates that the record had once existed in the circular log, then amnesia has not occurred. If the information does not indicate that the record had once existed in the circular log, then amnesia has occurred. Accordingly, amnesia detection is made possible even in a complicated circular log implementation.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which:

FIGS. 2A through 2E illustrate a log as it undergoes various example operations, and in which each record includes an associated interval identifier;

FIG. 5A illustrates the log of FIG. 2D, but with the further appending of records associated with a new unique interval identifier;

FIG. 5B illustrates the circular log of FIG. 5A after the checkpoint results in the removal of earlier log records;

DETAILED DESCRIPTION

Embodiments described herein relate to the setting up of a circular log implementation to be able to detect amnesia in a circular log, and to the determining whether or not amnesia has occurred. In a circular log, one or more records are removed from the circular log. However, in conjunction with this removal, information is preserved sufficient to detect whether or not the removed records ever existed in the circular log. If a request for information from a record were subsequently to be received by the circular log implementation, and if the record was not actually in the circular log, the preserved information could then be consulted to see if it indicates that the record had once existed in the circular log. If the information indicates that the record had once existed in the circular log, then amnesia has not occurred. If the information does not indicate that the record had once existed in the circular log, then amnesia has occurred. Accordingly, amnesia detection is made possible even in a complicated circular log implementation.

First, some introductory discussion will be presented describing a computing system that runs a log implementation that maintains a log. Then, a specific log implementation that uses intervals will be described with respect to FIGS. 2 through 5B. Then the log implementation operation to allow for amnesia detection even in a circular log will be described with respect to FIGS. 6-8.

In one implementation, the circular log implementation is performed by a computing system. Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

Figure 1:
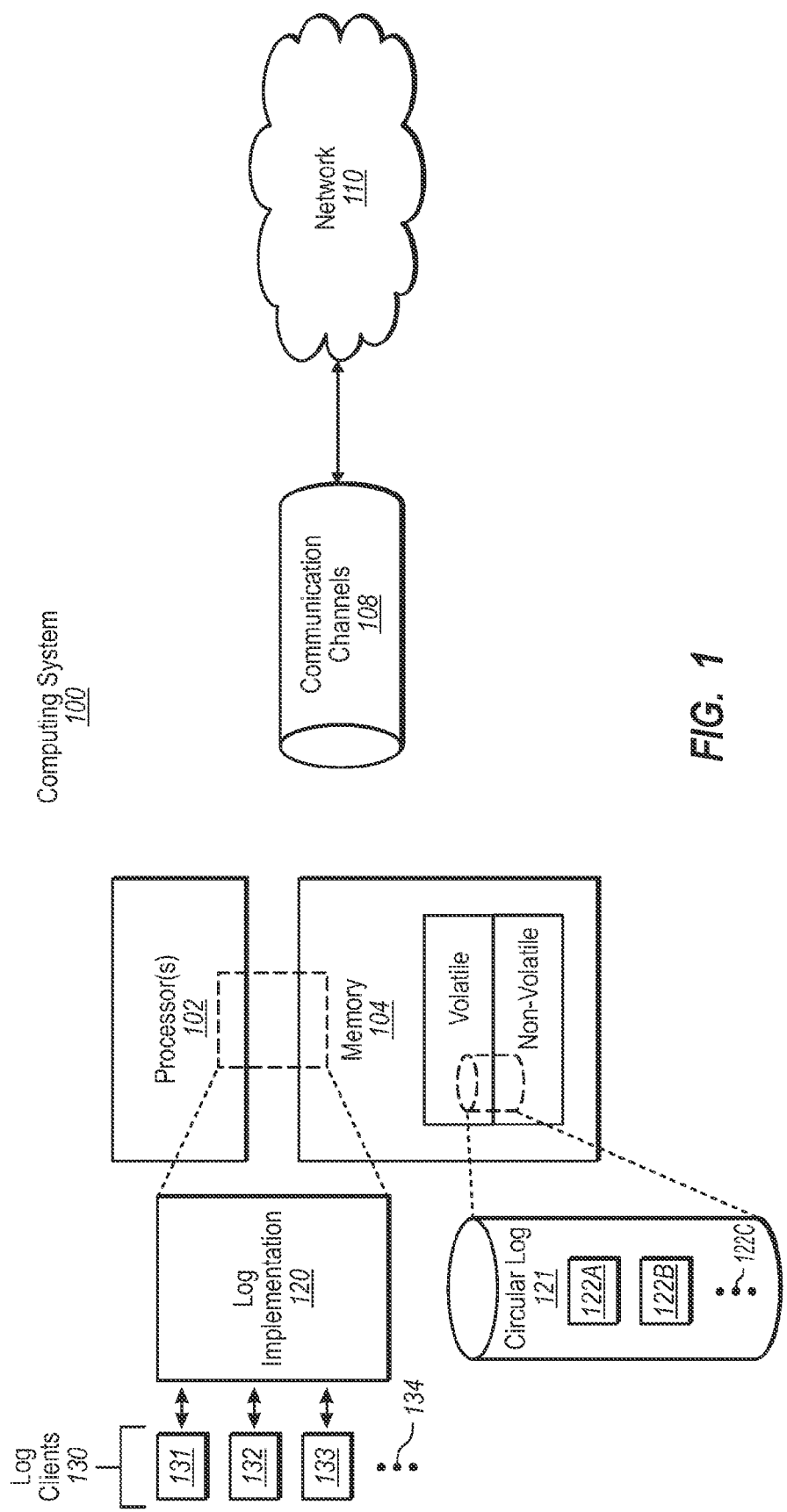
FIG. 1 illustrates an example computing environment that includes a log implementation managing a circular log and interfacing with a number of log clients.

FIG. 1 illustrates a computing system 100 that performs a circular log implementation 120 that manages a circular log 121. The circular log 121 includes a number of log records 122A and 122B amongst potentially more as represented by the vertical ellipses 122C. The log implementation 120 responds to log related requests from one or more log clients, which may be (but need not be) other computing systems, or other modules or components. In FIG. 1, such log clients 130 includes log clients 131, 132 and 133 amongst potential others as represented by the vertical ellipses 134.

In its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

As used herein, the term "module" or "component" can refer to software objects or routines that execute on the computing system. The different components, modules, engines, and services described herein may be implemented as objects or processes that execute on the computing system (e.g., as separate threads). For instance, one example of such a module or component is the log implementation 120, which contains the logic used to interface with the circular log 121. The log implementation 120 is shown spanning the processor(s) 102 and memory 104 of FIG. 1, to emphasize that in a software implementation of the log implementation 120, the implementation may be formulated using interaction between the processor(s) 102 and computer-executable instructions within the memory 104. The circular log 121 is shown as spanning the volatile and non-volatile portions of the memory 104 to emphasize that the circular log 121 may have portions in volatile memory, portions in non-volatile memory, and/or portions in storage.

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100.

Computing system 100 may also contain communication channels 108 that allow the computing system 100 to communicate with other message processors over, for example, network 110. Communication channels 108 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Log file amnesia occurs when a log had once contained a record, but due to some abnormal event, the log no longer contains the record. Typically, the log implementation that manages the log is not aware that the log had ever contained the lost record. This lack of awareness of a record that was lost due to an abnormal operation is termed "log amnesia". In contrast, in a circular log, some records are intentionally discarded in response to a checkpoint trigger. This allows the circular log to simulate an infinite log, without having to keep all records previously written to the log. Such a checkpoint trigger is not an abnormal event, but is a normal event that occurs in the implementation of a circular log. When a request for a particular record is received by the log implementation for a record that is not presently in the log, the principles described herein permit for a proper determination on whether amnesia has occurred, or whether the record was simply discarded due to a prior checkpoint trigger.

One of the most common causes for log amnesia is resetting the log. For instance, if the log were implemented as a file, the file may be reset. This means that the log file gets deleted and then recreated, losing all the recorded information about any work that was previously done. This can cause severe problems. For example, transaction management systems rely on log file data integrity to provide guarantees about the consistency of their transactions.

This particular scenario has a fairly well-known and straightforward solution. References to the records in the log file can be annotated with the time of the log file's creation, referred to as the log file's "birthday." When a log client using the log receives a reference to a record in the log file, it compares the timestamp contained in the reference to the log file's "birthday." If the current log file's birthday is newer than the timestamp that is associated with the reference to the log file, then the log client knows that the log file has been reset in between the time the reference to the record was handed out and now. That is, the log client can detect that this is an instance of log file amnesia, and it can react in a suitable manner.

However, this approach does not provide a solution for other scenarios. One such scenario is a restoration of the log file from a backup copy. In this scenario, the log file containing records 1 to n is backed up. Additional records after the back up are added to the log file (records n+1 to n+x) until an adverse incident occurs which requires the restoration of the last backed up copy of the log file. After restoration of the log file, the last records from the end of the log file that were added after the backup was made (records n+1 to n+x) are lost, resulting in log file amnesia. New records are now added to the restored log file (n+1' to n+x'). Since the original additional records (n+1 to n+x) and the new additional records (n+1' to n+x') all have the same "birthday" the above approach will not reveal that log file amnesia has occurred.

FIGS. 2A-2E show a graphic depiction of a log in one embodiment. Referring now to FIG. 2A, a log is created by a log implementation. The log may be a single log file, multiple log files, or may be implemented perhaps even without using files altogether. When creating the log, the log implementation creates a unique interval identifier (UID A) for a first time interval. Any arbitrary unique identifier may be used. For example, there are algorithms for generating globally unique 16-byte (128-bit) numbers called GUIDs (Globally Unique Identifier) that are suitable for this purpose. However, any other means of generating a unique identifier may be used. For example, a suitable software module built into the log implementation or in the operating system may be used to generate a 32-bit or 64-bit timestamp.

The first record in the log is assigned a Log Sequence Number (LSN). In this example, the LSNs increase monotonically from zero upwards. Accordingly, the first record in the log is assigned LSN 0. Further, the record is annotated with its UID A. Each subsequent record generated is assigned a sequential LSN number that is also annotated with UID A. After record LSN 5 is created, the log is backed up to durable storage, forming the "Backed Up Region" set of records shown. After the backup is done, there is additional activity which causes a set of three new records FIG. 2B. These three "Additional Records" are annotated using UID A, since these three "Additional Records" belong to the first time interval. The three Additional Records are further assigned respective sequence numbers LSN 7 through LSN 9.

In FIG. 2C, a restoration from backup is performed. The "Restored From Backup Region" set of records shown contains records LSN 0 through LSN 5. However, in the restoration process, the three records added to the log since the backup (LSN 6 through LSN 8) are lost, shown in FIG. 2C with dashed lines as "Lost (Amnesia)". Performing restoration from backup is an event that triggers the creation of a new unique interval identifier (UID) for the beginning of a next time interval. A unique interval identifier (UID B) for this next time interval is generated. As new work is done additional records are created and assigned LSNs (LSN 6', LSN 7', and LSN 8') which are each annotated with UID B and added to the log as shown in FIG. 2D as the set of "New Records". Note that the global log sequence numbers would still be 6, 7, and 8. LSN 6' is used to indicate that the record is for a different activity than LSN 6. The "New Records" are annotated with the new identifier (UID B) since these were added to the log after the creation of the new time interval.

The log "birthday" approach described above cannot identify this log amnesia situation since the log client cannot tell the difference between records LSN 6 and LSN 6'. The "birthday" of the log in the approach described above did not change, and so LSN 6 and LSN 6' appear to be identical because they have identical LSNs and the same "birthday." However, by annotating each record with a unique interval identifier, UID A and UID B, based upon the different time intervals involved, the log client is able to tell the difference between LSN 6 and LSN 6' since their unique interval identifier is different. This approach allows detection of log amnesia due to restoration of a log file from backup because the unique identifier of every time interval started since the backup was restored will be different from any unique identifier generated before the backup was taken.

Assume now after the creation of record LSN 8' that the log has to be completely reset. This also is an event that triggers the creation of a new unique identifier for the beginning of a next time interval. A unique identifier (UID C) for this next time interval is generated. As new work is done, an additional set of records are created and assigned LSNs (LSN 0", LSN 1", LSN 2", LSN 3", and LSN 4") which are each annotated with UID C shown in FIG. 2E as "New Records After Reset". If the log has the state shown in FIG. 2E, any references to records LSN 0 through LSN 8 annotated with UID A and records LSN 6' through LSN 8' annotated with UID B will be identified as log amnesia since all references to LSN 0-LSN 4 should be annotated with UID C, and there are no records at all in the log at the time of FIG. 2E associated with LSN 5-LSN 8. Thus, detection of log amnesia due to the complete reset of the log is possible because every unique interval identifier in the reset log will be different from any of the unique identifiers that were in the log before it was reset.

A log client may perform many different operations on a log including: (1) read some record as identified by a log sequence number; (2) append a new record and receive back the log sequence number assigned; and (3) force the log to be written to durable storage. The log client does not need to know about the structure of the LSNs. As far as the log client knows, the LSN is just a handle to an object that it gets back. Therefore, when the log implementation is part of the operating system and it includes the LSN/UID functionality, any existing log client associated with an application will be able to receive all of the benefits of this approach to detecting log amnesia. The functionality is built into the log implementation itself and not individual log clients. Thus, any application with a log client could utilize this way of detecting log amnesia so long as the log implementation has the LSN/UID functionality built in.

When the log implementation is part of an application, the need to mark the beginning of a new time interval may also be identified by the log file implementation for the application according to its particular design and purpose. All that the application needs to do is to identify all the situations when, in a normal usage scenario, there might have passed periods of time that it does not know the details about. These situations necessarily define the spaces between successive time intervals. For example, a good time to start a new interval is when the log is created, or as shown above, when restored from a backup copy. At an upper limit an application might go as far as to start a new time interval whenever writing to the log file. Another triggering event could be a computer reboot. All these are valid scenarios and how often and when a new time interval is annotated in the log is entirely up to the particular application.

Action to be taken when log amnesia is recognized depends upon the application and each particular situation, which is highly context dependent. The only commonality is that it is generally not something that the processing system can recover from on its own. Once log file amnesia is detected, the processing system typically cannot make any further forward progress, and human intervention is usually required. When an application reads or retrieves a record with a LSN/UID pair, and a comparison is made with the log, and there is no recognition of the record (indicating log amnesia), what happens next depends upon the particular application.

In typical operation, the log client will make a request to the log implementation, and the log implementation would fail the request with some sort of returned distinguished error message that says the request failed because log amnesia was detected. For example, a database may be failing upon recovery, or while running, or a transaction manager or a queue manager encounters a problem when the log client request is made. The actual error message returned is really highly dependent upon what the overall context of the operation was. The operations should be at low enough levels that it is not possible to tell what was actually happening when log amnesia was detected, such as adding a new customer record, for example. So the log client request of some operation from the log file implementation will be returned with a confirmation of the operation or a non-confirmation of the operation. The non-confirmation response can have many different reasons, one of them being that a comparison step of the record in hand with the records in the log file failed, indicating log file amnesia. Generally speaking, processing systems should stop and refuse to do anything else when log amnesia is detected. Log amnesia is an indication that something went wrong, and most processing systems will stop because going forward could potentially cause more damage. When the log amnesia error message is received, usually a human has to decide what action to take. Log amnesia indicates that some data is missing, and a human operator needs to look into the matter to try and determine what data is missing, why it is missing, and what steps to take, if any are possible, to recover the missing data.

FIGS. 3A-3E show a graphic depiction of a log in another embodiment. The embodiment described above in relation to FIGS. 2A-2E may be somewhat cumbersome on the log, as it needs to record the unique identifier for each time interval with every record. This can be viewed as a waste of space. Log records are generally kept as small as possible, because otherwise, appending to the log may become a bottleneck for the log client.

Therefore, instead of appending the unique identifier for each time interval to each record, it is sufficient for a log implementation to append a single record which marks the beginning of the interval and records the unique interval identifier for that interval. The unique interval identifier associated with any given record/LSN can then be determined by scanning backwards through the log until one of these "begin interval" records is found. This "begin interval" record then indicates the unique interval identifier for the record in question.

However, this would be a de-optimization of the append request process if it were actually performed as described above. Fortunately, there is an easy optimization. A log implementation may simply store the identifier of the current interval in main memory rather than scanning backwards to find it for the append request process.

Referring now to FIGS. 3A-3E, the same scenario described in reference to FIGS. 2A-2E applies to this embodiment, except that only the "begin interval" record is annotated with the unique interval identifier for each new time interval. Record 302 (LSN 0, UID A) is the "begin interval" record associated with the Backed Up Region of records in FIGS. 3A and 3B and the Restored From Backup Region of records in FIGS. 3C and 3D. Record 304 (LSN 6', UID B) is the "begin interval" record associated with the New Records region of records in FIG. 3D. Record 306 (LSN 0", UID C) is the "begin interval" record associated with the New Records After Reset region of records in FIG. 3E.

Figure 3A:
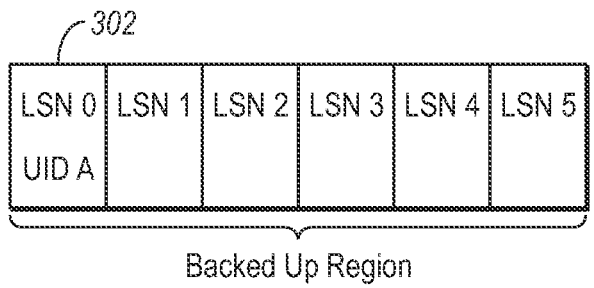
FIGS. 3A through 3E illustrate a log as it undergoes various example operations, and in which only one record for each interval includes a unique interval identifier.
Figure 3B:
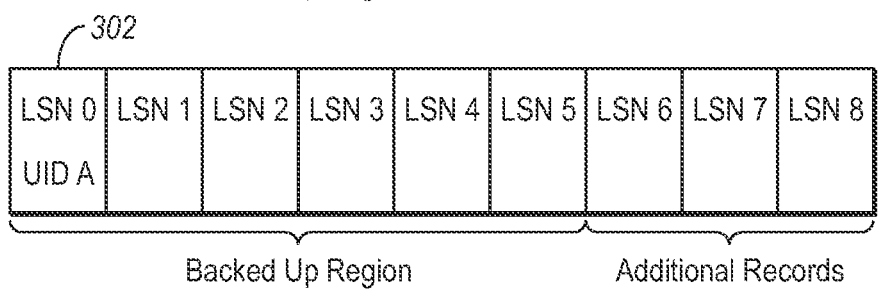
Figure 3C:
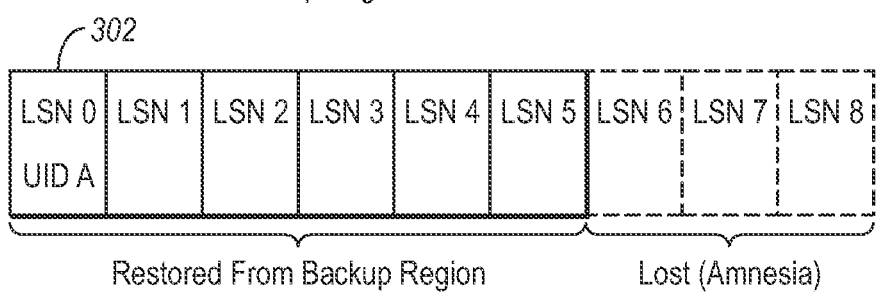
Figure 3D:
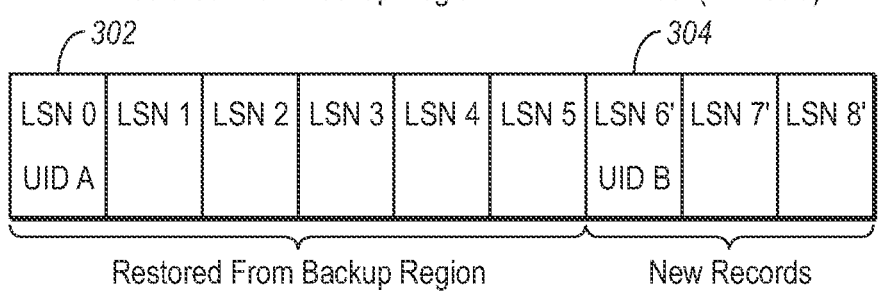
Figure 3E:
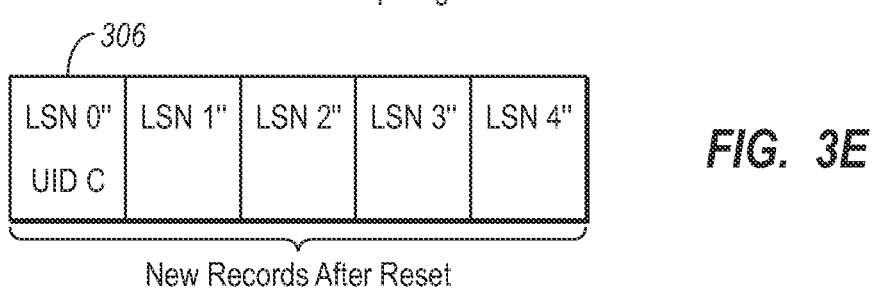
Figure 4:
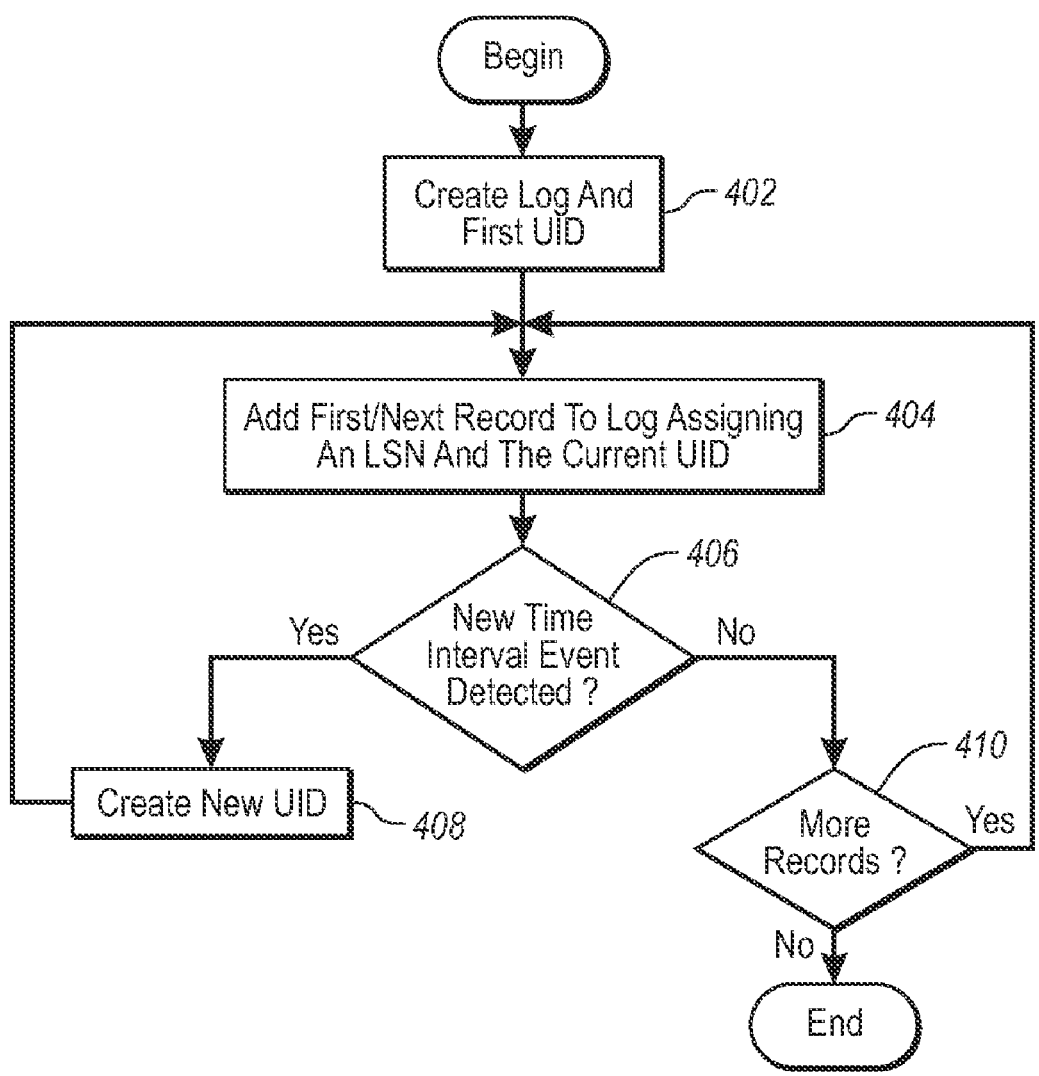
FIG. 4 illustrates a flowchart of a method for storing records in a log to enable log file amnesia detection.

FIG. 4 shows a block flow diagram for storing records in a log to enable log amnesia detection. Referring now to FIG. 4, a log and a unique identifier (UID) for a first time interval are created (act 402). A first record is written to the log and a sequential LSN is assigned to the record and annotated with the current UID (act 404) for the embodiment shown in FIGS. 2A through 2E. Otherwise, for the embodiment shown in FIGS. 3A through 3E, only the first record is annotated with the current UID, and the current UID is stored in memory.

Decision block 406 represents whether or not an event is encountered that results in the regeneration of a new unique interval identifier. If such a triggering event is detected (Yes in decision block 406), then a new UID is created (act 408) and control returns to act 404 where the next record added to the log file will be annotated with the new UID and the next sequential LSN. If no such event is detected (No in decision block 406), then it is determined if there are more records to be appended to the log file (decision block 410).

If there are more records to be appended (Yes in decision block 410), then control returns to act 404 where the next record added to the log file will be assigned the next sequential LSN and annotated with the current UID for the embodiment shown in FIGS. 2A through 2E. Otherwise, for the embodiment shown in FIGS. 3A through 3E, the next record is only assigned the next sequential LSN and is not annotated with the current UID. Typically, for an infinite log or a circular log, there will almost always be more records to be appended. However, if there are no more records to append to the log (No in decision block 410), the method ends.

Now that amnesia detection has been described in the context of a general log with respect to FIGS. 2A-2E and 3A-3E, and a process for appending new records to a log have been described with respect to FIG. 4, the application of these concepts to a circular file will be described with respect to FIG. 5.

FIG. 5A extends the example of FIGS. 3A through 3E by building upon the log illustrated in FIG. 3D. For the example of FIG. 5A, assume that the resetting of the log to result in the log of FIG. 3E did not actually occur. In FIG. 3D, the log begins with records LSN 0 through LSN 5, each being associated with unique interval identifier UID A. Although at one point records LSN 6 through LSN 8 (associated with UID A) were appended to the log (see FIG. 3B), those records are now lost from the log (see FIG. 3C). Subsequently, new records LSN 6' through LSN 8' were appended to the log, each new record being associated with unique interval identified UID B. In FIG. 5A, it is assumed that subsequent to the appending of record LSN 8' of FIG. 3D, an event occurred that required the beginning of a new interval identified by UID C, but which did not result in the records LSN 6' through LSN 8' being lost from the log. In particular, in FIG. 4, new records LSN 9 through LSN 13 (labeled as "Newer Records") are appended to the log, each new record being associated with unique interval identifier UID C.

In a circular log, older records of the log tend to be discarded in response to checkpoint triggers. Accordingly, if the log of FIG. 5A were a circular log, there may be entries that were part of the log (perhaps prior to interval UID A), which have now been discarded due to a prior checkpoint trigger. Furthermore, a subsequent checkpoint trigger may cause some of the existing records of the log of FIG. 5A to be removed.

Figure 6:
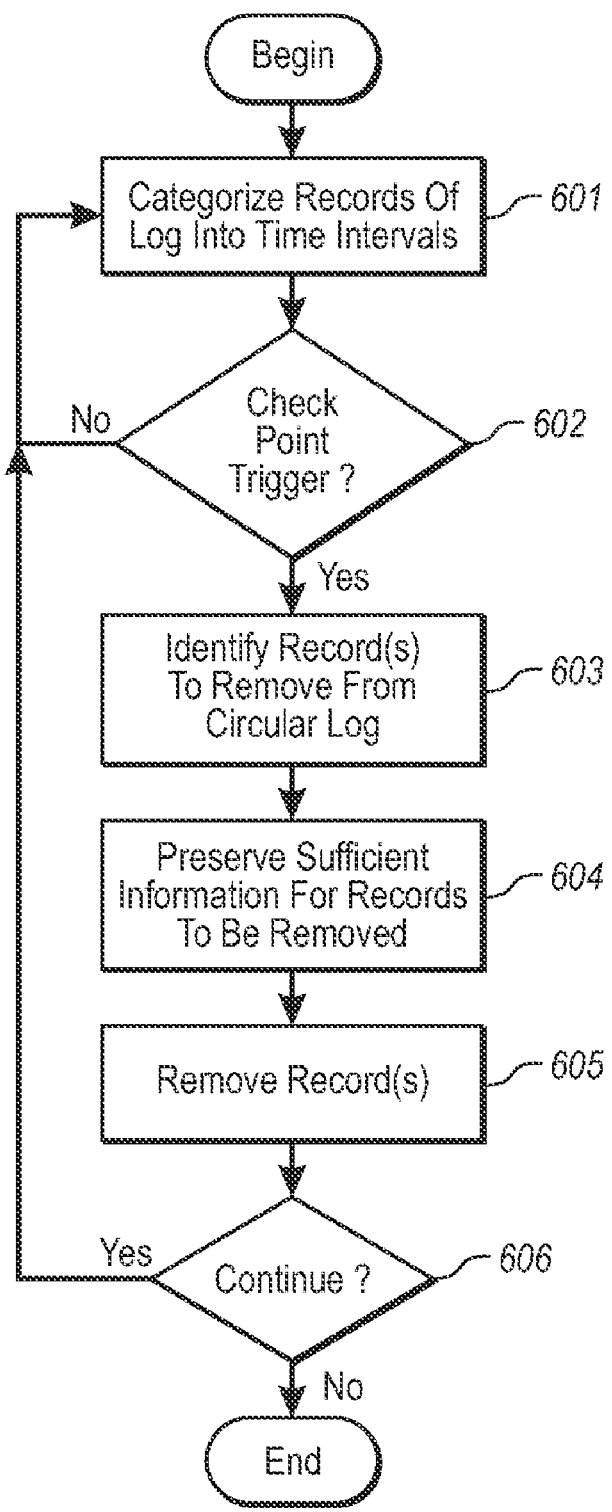
FIG. 6 illustrates a flowchart of a method for performing a checkpoint on a circular log while preserving the opportunity to detect amnesia.

FIG. 6 illustrates a flowchart of a method for setting up a log implementation that manages a circular log to be able to perform amnesia detection for the circular log. The method will be described with respect to the circular log of FIG. 5A, which shows the initial state of the circular log.

The method includes the categorization of the records of the circular log into time intervals. This may occur naturally by performing the method of FIG. 4 when new records are to be appended to the log. In the example of FIG. 5A, the records LSN 0 through LSN 5 are associated with interval UID A, LSN 6' through LSN 8' are associated with interval UID B, and LSN 9 through LSN 13 are associated with interval UID C.

The act 601 may actually continue in the background continuously as the rest of the method is performed. In any case, a circular log tends to advance in time, with older records being removed from the log in response to a checkpoint trigger. Checkpoint triggers may include, for example, the expiration of a time period since the last checkpoint, user request, the available space for the log dropping below a certain threshold, and so forth.

Accordingly, the method of FIG. 6 includes a decision block 602 in which it is determined whether or not a checkpoint trigger is detected. If a checkpoint trigger is not detected (No in decision block 602), then the method simply continues to append new records to the log, for example, in the manner described with respect to FIG. 4.

When a checkpoint trigger is detected (Yes in decision block 602), then the log implementation identifies one or more records to remove from the circular log (act 603). For instance, in the context of the circular log of FIG. 5A, suppose that there are three log clients that use the circular log. In the case of FIG. 1, suppose that there are three log clients 131 through 133 that use the circular log 121.

The log implementation may query each of these log clients to find out the earliest log record that the log client would be interested in. For each log client, this earliest record is referred to as the "low water mark" for that log client. In one example, assume that log client 131 indicates that LSN 11 UID C is its low water mark. Suppose further that the log client 132 indicates that LSN 7' UID B is its low water mark. Finally, log client 132 indicates that LSN 8' UID B is its low water mark. In this case, the "global" low water mark for all of the log clients would be the earliest of the low water marks (i.e., LSN 7' UID B). Thus, the log implementation may determine that it can remove all log records prior to the global low water mark. In this particular example, LSN 0 through LSN 5 of UID A can be removed, along with LSN 6' of UID B, resulting in the modified circular log of FIG. 5B.

Returning to FIG. 6, for at least one (and perhaps all) of the identified records for removal, the log implementation preserves sufficient information to determine that the removed record once existed in the circular log, and sufficient to identify the interval in which the removed record existed (act 604). For example, in the context of FIG. 5A, records LSN 0 through LSN 5 of UID A and LSN 6' of UID B are to be removed.

Figures 7, 8:
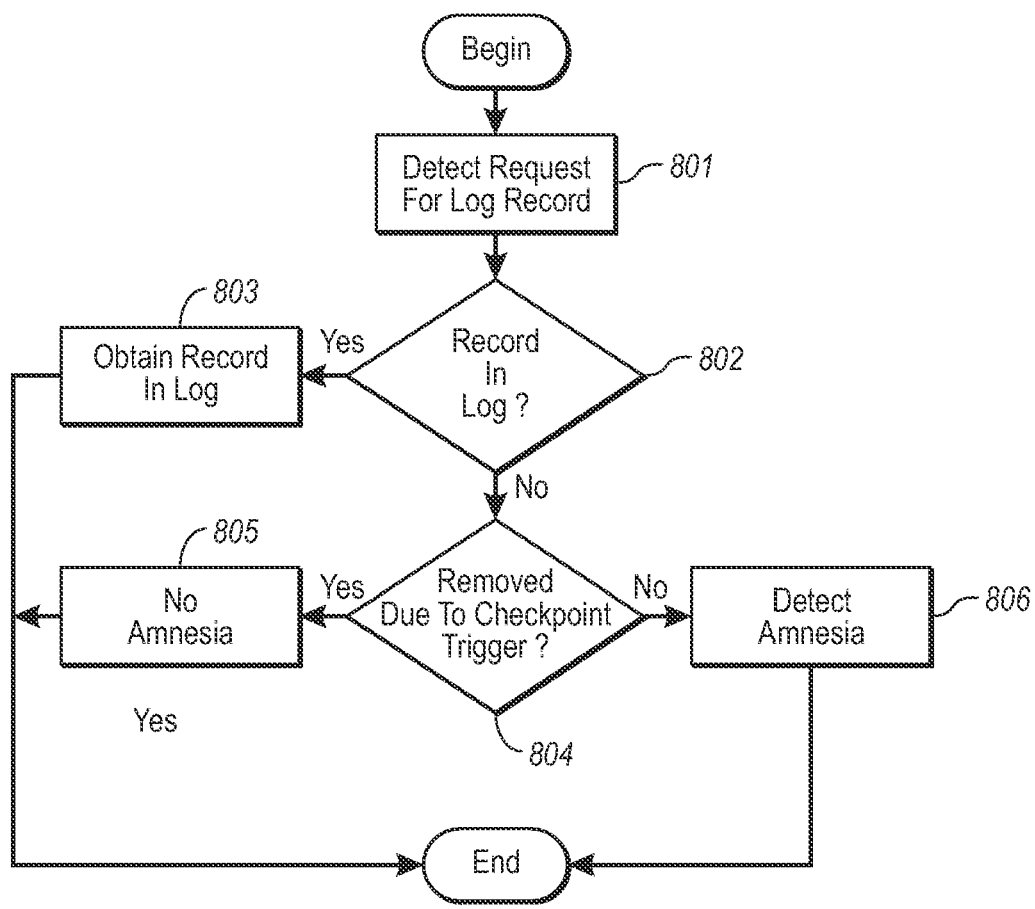
FIG. 7 schematically illustrates an example data structure that preserves information regarding records that exist or once existed in the example circular log.
FIG. 8 illustrates a flowchart of a method for detecting amnesia in a circular log in response to a request for a log record.

FIG. 7 schematically illustrates a data structure of a table that may be used by the log implementation. In this case, the table includes an identification of all the UIDs that had existed in the circular log. Note that in this case, that there seem to have been three prior UIDs (i.e., UID x, UID y, and UID z) that had once existed in the circular log. Records from those UIDs are no longer illustrated in FIG. 5 due to perhaps a prior checkpoint trigger and similar record removal process. For each interval, the table also lists the beginning LSN for that interval. For instance, UID x began with LSN –10 (minus 10), UID y began with LSN –7 (minus 7), UID z began with LSN –4 (minus 4), UID A begins with LSN 0 (as shown in FIG. 5A), UID B begins with LSN 6 (as shown in FIG. 5A), and UID C begins with LSN 8 (as shown in FIG. 5A). Accordingly, the table of FIG. 7 includes sufficient information regarding the circular log of FIG. 5A to identify all records (by LSN number of UID) that have been removed by prior checkpoint triggers. In one embodiment, the information represented in the table may be written as a new record to the log, thereby preserving the information in advance of the last checkpoint.

The identified records for removal may then be removed from the circular log (act 605). This may be performed after the preservation of the information sufficient to determine that the record had existed but was removed by a checkpoint trigger (act 604). Alternatively, the removal may be accomplished atomically in the same transaction as the preservation of information. If the process is to continue (Yes in decision block 606), then the method proceeds to act 601, where the log continues to be appended to as records are written. Otherwise (No in decision block 606), the method may end.

FIG. 8 illustrates a flowchart of a method for detection amnesia. FIG. 8 will be described with respect to the circular log of FIG. 5A, and the table of FIG. 7. However, the principles of FIG. 8 may be applied to any circular log, regardless of the manner in which the information regarding deleted records is preserved. In the example described with respect to FIG. 8, it is assumed that the records LSN 0 through LSN 5 of UID A, and LSN 6' of UID B have been removed in response to a checkpoint trigger. It is further assumed that information sufficient to identify the records as having been removed (and their responding UID) are included within record LSN 14 of UID C in the circular log.

Referring to FIG. 8, the method may be initiated by the log implementation (e.g., log implementation 120 of FIG. 1) whenever a request for information of an identified record is received from a log client (e.g., one of log clients 130). The receipt of this request is represented by act 801 in FIG. 8.

The log implementation determines whether the record identified in the request is actually still present in the log (decision block 802). For example, in the example of FIG. 5B, in which records LSN 1 through 5, and LSN 6' are removed, if the request was for information from record LSN 7' in UID B, LSN 8' in UID B, or any one of LSN 9 through 13 in UID C, then the information may simply be obtained from the record in the log (act 803), thereby concluding the method with respect to that request.

On the other hand, if the record is not in the log (No in decision block 802), the preserved information is used to determine whether or not the identified record in the request was removed from the circular log as a result of a checkpoint trigger (decision block 804). Cases with respect to FIGS. 5B and 7 in which the table of FIG. 7 would indicate that the record had been removed in response to a prior checkpoint trigger (Yes in decision block 804) will now be described.

For instance, if a request for any one of LSN −10 (minus 10) through LSN −8 (minus 8) were received, then the record may be identified using the table as being removed from the log in response to a prior checkpoint trigger, so long as the request identified the record as corresponding to UID x. If a request for any one of LSN −7 through LSN −5 were received, then the table may be used to determine that the requested record has been removed in response to a prior checkpoint trigger, so long as the request indicated that the record was in UID y. If a request for any one of LSN −4 through −1 were received, then the table may be used to determine that the requested record has been removed in response to a prior checkpoint trigger, so long as the request indicated that the record was in UID z. If a request for any one of LSN 0 through LSN 5 were received, then the table may be used to determine that the requested record has been removed in response to a prior checkpoint trigger, so long as the request indicated that the record was in UID A. If a request for LSN 6' were received, then the table may be used to determine that LSN 6' has been removed in response to a prior checkpoint trigger, so long as the request indicated that the record was in UID B.

In these cases, the log implementation would determine that there has been no amnesia (act 805), but that the record has been removed in the normal course of maintaining the circular log in response to a prior checkpoint trigger. Appropriate action would be taken for that kind of case. For instance, the log implementation may notify the log client that the record is no longer available, even though the record identification is valid. The method then ends until the next log record request is received (act 801).

If the record was not removed as a result of a prior checkpoint as indicated by the preserved information (No in decision block 804), then amnesia is detected (act 806). For example, referring to FIGS. 5B and 7, the following requests might be indicative of amnesia. If a request is received for LSN 6 through LSN 8 in UID A, then amnesia is detected since the wrong UID is specified for the existing log. After all, LSN 6' through 8', which the log implementation knows about, correspond to UID B, not UID A. Note that the request records were lost to the log as illustrated in FIG. 3C. Other cases of amnesia may be present, but which have not been specifically illustrated. For example, if a request for a record other than LSN −10 through 13 were to be received, that would be consistent with amnesia. The following requests would also be indicative of amnesia: 1) a request for one of LSN −10 through −8, but for a UID other than UID x, 2) a request for one of LSN −7 through −5, but for a UID other than UID y, 3) a request for one of LSN −4 through −1, but for a UID other than UID z, 4) a request for one of LSN 0 through LSN 5, but for a UID other than UID A, 5) a request for one of LSN 6-8, but for a UID other than UID B, or 6) a request for one of LSN 9-13, but for a UID other than UID C.

Once amnesia is detected (act 806), then appropriate action may be taken. As mentioned above, the type of action taken may be differ depending on the application. However, the principles described herein allow the log implementation to sense when a record is missing from the log due to amnesia, or due to normal operation. Such a distinction allows different action to be taken as appropriate, rather than taking a standard action in both cases.

Accordingly, the embodiments described herein present an effective mechanism for performing log amnesia detection for a circular log. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising one or more computer-readable storage media having stored thereon computer-executable instructions that, when executed by one or more processors of a computing system, cause the computing system to perform a method for setting up a log implementation that is configured to manage a circular log and perform detection of an error condition with respect to the circular log, the method comprising:
   an act of categorizing a plurality of records of the circular log into a plurality of time intervals, comprising:
   assigning, sequentially, each of the plurality of records a different sequence identifier that identifies an order in which each record of the plurality of records was added to the circular log, each sequence identifier being part of a plurality of sequence identifiers that span the plurality of time intervals; and
   associating each of the plurality of records with one of the plurality of time intervals during which said record was added to the circular log, wherein each time interval is created in response to a triggering event and wherein each time interval is assigned a unique identifier, the unique identifier being distinguished from the sequence identifier, such that each of the plurality of records is uniquely identified by both a corresponding unique identifier and a corresponding sequence identifier;
   an act of detecting a checkpoint trigger, that indicates that one or more of the plurality of records are to be removed from the circular log;
   in response to the detection of the checkpoint trigger, an act of identifying one or more of the plurality of records to remove from the circular log;
   for at least one of the identified records for removal, an act of preserving sufficient information to determine that the identified record once existed in the circular log and which contains less than the entire identified record, wherein the sufficient information is preserved by storing a particular unique identifier for a particular time interval to which the identified record was associated along with information indicating that a particular sequence identifier corresponding to the identified record once existed in connection with the particular unique identifier for the particular time interval; and
   an act of removing the identified records from the circular log.

2. The computer program product in accordance with claim 1, wherein the act of preserving sufficient information is performed for all of the identified records for removal.

3. The computer program product in accordance with claim 2, wherein the checkpoint trigger is a most recent checkpoint trigger for the circular log, wherein the act of preserving sufficient information is performed also for all records that had once existed in the circular log, but which had been removed from the log file due to one or more prior checkpoint triggers prior to the most recent checkpoint trigger.

4. The computer program product in accordance with claim 1, wherein the circular log is a circular log file.

5. The computer program product in accordance with claim 1, wherein the circular log comprises one or more circular log files.

6. The computer program product in accordance with claim 1, wherein the act of preserving sufficient information comprises an act of adding one or more records that includes the sufficient information to the circular log.

7. The computer program product in accordance with claim 1, wherein the act of preserving sufficient information occurs atomically in the same transaction as the act of removing the identified records.

8. The computer program product in accordance with claim 1, wherein the act of preserving sufficient information occurs prior to the act of removing the identified records.

9. The computer program product in accordance with claim 1, the method further comprising:
   an act of detecting a request for information from a record, the information including a first unique identifier associated with a time interval corresponding to the record and a first sequence identifier associated with the record;
   an act of determining that the record identified in the request is not presently in the circular log; and
   an act of accessing the preserved sufficient information about records that have been previously removed from the circular log to verify whether the preserved sufficient information indicates that the record identified in the request had ever existed in the circular log, and which consists of less than an entirety of the record, comprising using the preserved sufficient information to determine whether or not the first sequence identifier exists in the sufficient information in connection with the first unique identifier.

10. The computer program product in accordance with claim 9, further comprising:
   based on the act of accessing, an act of determining that the preserved sufficient information does not indicate that the record identified in the request had existed in the circular log thereby detecting an error condition with respect to the record identified in the request, wherein the error condition indicates either (1) that the identified record did not previously exist in the circular log or (2) that amnesia has occurred in the circular log because the identified record previously existed in the circular log but the preserved sufficient information indicates that the identified record did not exist in the circular log.

11. The computer program product in accordance with claim 10, wherein the request for information is a first request for information from a first record, the method further comprising:
   an act of detecting a second request for information from a second record;
   an act of determining that the second record identified in the second request is not presently in the circular log; and
   an act of using the preserved sufficient information to verify that the second record identified in the second request had once existed in the circular log, thereby avoiding a detection of an error condition with respect to the second record identified in the second request and the circular log.

12. The computer program product in accordance with claim 9, further comprising:
   based on the act of accessing, an act of determining that the preserved sufficient information indicates that the record identified in the request had existed in the circular log thereby avoiding a detection an error condition with respect to the record identified in the request and the circular log.

13. The computer program product in accordance with claim 1, wherein a new interval is created and assigned a new particular unique identifier when the circular log is reset.

14. The computer program product in accordance with claim 1, wherein the act of preserving sufficient information excludes preserving the removed record itself.

15. The computer program product in accordance with claim 1, wherein the triggering event comprises at least one of a restoration of the circular log from backup or a circular log reset.

16. The computer program product in accordance with claim 1, further comprising writing a corresponding sequence identifier to each of the plurality of records, and writing a corresponding unique identifier to only a first record associated with the corresponding time interval.

17. The computer program product in accordance with claim 1, wherein the sequence identifier comprises a monotonically increasing sequence identifier.

18. The computer program product in accordance with claim 1, wherein the unique identifier comprises a globally unique identifier.

19. A method implemented within a computer system that includes at least one processor and memory storing instructions which, when executed by the at least one processor, implement the method for setting up a log implementation that is configured to manage a circular log and perform detection of an error condition with respect to the circular log, the method comprising:
   an act of categorizing a plurality of records of the circular log into a plurality of time intervals, comprising:
     assigning, sequentially, each of the plurality of records a different sequence identifier that identifies an order in which each record of the plurality of records was added to the circular log, each sequence identifier being part of a plurality of sequence identifiers that span the plurality of time intervals; and
     associating each of the plurality of records with one of the plurality of time intervals during which said record was added to the circular log, wherein each time interval is created in response to a triggering event and wherein each time interval is assigned a unique identifier, the unique identifier being distinguished from the sequence identifier, such that each of the plurality of records is uniquely identified by both a corresponding unique identifier and a corresponding sequence identifier;
   an act of detecting a checkpoint trigger that indicates that one or more of the plurality of records are to be removed from the circular log;
   in response to the detection of the checkpoint trigger, an act of identifying one or more of the plurality of records to remove from the circular log;
   for at least one of the identified records for removal, an act of preserving sufficient information to determine that the identified record once existed in the circular log and which contains less than the entire identified record, wherein the sufficient information is preserved by storing a particular unique identifier for a particular time interval to which the identified record was associated along with information indicating that a particular sequence identifier corresponding to the identified record once existed in connection with the particular unique identifier for the particular time interval; and an act of removing the identified records from the circular log.

20. A computer system, comprising:

at least one processor; and one or more computer storage media having stored thereon computer executable instructions that, when executed by the at least one processor, implement a method for setting up a log implementation that is configured to manage a circular log and perform detection of an error condition with respect to the circular log, the method comprising:

an act of categorizing a plurality of records of the circular log into a plurality of time intervals, comprising:

assigning, sequentially, each of the plurality of records a different sequence identifier that identifies an order in which each record of the plurality of records was added to the circular log, each sequence identifier being part of a plurality of sequence identifiers that span the plurality of time intervals; and associating each of the plurality of records with one of the plurality of time intervals during which said record was added to the circular log, wherein each time interval is created in response to a triggering event and wherein each time interval is assigned a unique identifier, the unique identifier being distinguished from the sequence identifier, such that each of the plurality of records is uniquely identified by both a corresponding unique identifier and a corresponding sequence identifier;

an act of detecting a checkpoint trigger that indicates that one or more of the plurality of records are to be removed from the circular log;

for at least one of the identified records for removal, an act of preserving sufficient information to determine that the identified record once existed in the circular log and which contains less than the entire identified record, wherein the sufficient information is preserved by storing a particular unique identifier for a particular time interval to which the identified record was associated along with information indicating that a particular sequence identifier corresponding to the identified record once existed in connection with the particular unique identifier for the particular time interval; and an act of removing the identified records from the circular log.

\* \* \* \* \*